(12) United States Patent
Tobin et al.

(10) Patent No.: US 9,709,030 B2
(45) Date of Patent: Jul. 18, 2017

(54) METHODS OF MANUFACTURING ROTOR BLADE COMPONENTS FOR A WIND TURBINE

(71) Applicant: General Electric Company, Schenectady, NY (US)

(72) Inventors: James Robert Tobin, Simpsonville, SC (US); Thomas Joseph Fischetti, Fountain Inn, SC (US); William Max Gobeli, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 383 days.

(21) Appl. No.: 14/318,964

(22) Filed: Jun. 30, 2014

(65) Prior Publication Data

US 2015/0167633 A1   Jun. 18, 2015

Related U.S. Application Data

(63) Continuation-in-part of application No. 14/107,040, filed on Dec. 16, 2013, now Pat. No. 9,574,544.

(51) Int. Cl.
*B29C 44/12* (2006.01)
*B29C 44/14* (2006.01)
(Continued)

(52) U.S. Cl.
CPC ........ *F03D 1/0675* (2013.01); *B29C 44/1285* (2013.01); *B29C 44/14* (2013.01);
(Continued)

(58) Field of Classification Search
CPC .. F03D 1/0675; F03D 1/0683; F05B 2230/90; F05B 2240/30; F05B 2240/311;
(Continued)

(56) References Cited

U.S. PATENT DOCUMENTS 4,260,332 A   4/1981 Weingart et al.
4,412,784 A   11/1983 Wackerie et al.
(Continued)

FOREIGN PATENT DOCUMENTS

EP   1707805 A2   10/2006
EP   2599715 A1   6/2013
(Continued)

OTHER PUBLICATIONS

Pirsch, Stephen, "How to Build Your First Surfboard", pp. 1-8, www.surfersteve.com/polystyrene.htm., 2003.
(Continued)

*Primary Examiner* — Christopher Verdier
*Assistant Examiner* — Christopher R Legendre
(74) *Attorney, Agent, or Firm* — GE Global Patent Operation (57) ABSTRACT

Methods of manufacturing rotor blade components for a wind turbine and rotor blade components produced in accordance with such methods are disclosed. In one embodiment, the method generally includes providing a mold of the rotor blade component; coating at least a portion of an interior surface of the mold with an elastomeric material; inserting impletion material within the mold so as to at least partially reduce an open internal volume within the mold; inserting a foam material within the mold; and, removing the rotor blade component from the mold, wherein the elastomeric material forms a cover skin around at least a portion of the rotor blade component. In an alternative embodiment, the method includes providing at least one support member defining a profile for the rotor blade component on a mold surface; coating at least a portion of the support member with an elastomeric material; and, allowing the elastomeric material to cure on the mold surface so as to form the rotor blade component.

20 Claims, 6 Drawing Sheets

(51) Int. Cl.
*F03D 1/06* (2006.01)
*B29K 105/04* (2006.01)
*B29K 75/00* (2006.01)
*B29K 675/00* (2006.01)
*B29L 31/08* (2006.01)

(52) U.S. Cl.
CPC ...... *B29K 2075/00* (2013.01); *B29K 2105/04* (2013.01); *B29K 2675/00* (2013.01); *B29L 2031/085* (2013.01); *F05B 2240/301* (2013.01); *F05B 2260/96* (2013.01); *F05B 2280/4003* (2013.01); *F05B 2280/6012* (2013.01); *Y02E 10/721* (2013.01); *Y02P 70/523* (2015.11)

(58) Field of Classification Search
CPC .......... F05B 2240/32; F05B 2280/4003; F05B 2280/6012; B29C 44/1285; B29C 44/14
See application file for complete search history.

(56) References Cited

U.S. PATENT DOCUMENTS

| | | | |
|---|---|---|---|
| 4,494,910 A | 1/1985 | Hahn et al. | |
| 4,648,921 A | 3/1987 | Nutter, Jr. | |
| 4,696,623 A * | 9/1987 | Bost ................... | B29D 99/0025 416/226 |
| 4,892,462 A * | 1/1990 | Barbier .............. | B29D 99/0025 416/134 A |
| 5,042,968 A * | 8/1991 | Fecto ..................... | B29C 44/16 264/46.6 |
| 5,222,297 A * | 6/1993 | Graff ..................... | B29C 70/865 29/889.7 |
| 5,489,228 A | 2/1996 | Richardson | |
| 5,542,820 A | 8/1996 | Eaton et al. | |
| 5,632,602 A | 5/1997 | Hermann et al. | |
| 6,089,503 A * | 7/2000 | Volk ........................ | B64C 3/38 244/35 R |
| 6,305,905 B1 | 10/2001 | Nagle et al. | |
| 6,726,865 B2 * | 4/2004 | Mielke ................ | B29C 37/0032 156/245 |
| 7,550,550 B2 | 6/2009 | Klein et al. | |
| 7,816,481 B2 | 10/2010 | Klein et al. | |
| 8,162,590 B2 | 4/2012 | Haag | |
| 8,250,761 B2 * | 8/2012 | Tobin ................. | B29D 99/0025 29/889.7 |
| 8,573,933 B2 * | 11/2013 | Presz, Jr. ................... | F03D 1/04 415/182.1 |
| 8,695,925 B2 * | 4/2014 | Khorrami ................ | B64C 9/02 244/212 |
| 8,961,142 B2 * | 2/2015 | Wansink ............ | B29D 99/0025 416/224 |
| 9,410,434 B2 * | 8/2016 | Petellaz ..................... | F01D 5/147 |
| 2006/0225278 A1 * | 10/2006 | Lin ......................... | F03D 1/001 29/889.72 |
| 2007/0231156 A1 | 10/2007 | Hong | |
| 2008/0069699 A1 | 3/2008 | Bech | |
| 2009/0162208 A1 | 6/2009 | Zirin et al. | |
| 2009/0264034 A1 | 10/2009 | Gasparro | |
| 2010/0028159 A1 | 2/2010 | Brown | |
| 2010/0329880 A1 | 12/2010 | Davis et al. | |
| 2011/0225796 A1 | 9/2011 | Okutan | |
| 2012/0141283 A1 * | 6/2012 | Bell ....................... | F03D 1/0675 416/226 |
| 2012/0321479 A1 * | 12/2012 | Bruun .................... | B29C 44/569 416/226 |
| 2013/0136615 A1 * | 5/2013 | Nagle ..................... | F01D 5/147 416/230 |
| 2015/0167474 A1 * | 6/2015 | Tobin .................... | F03D 1/0675 416/229 R |
| 2015/0167633 A1 * | 6/2015 | Tobin .................... | F03D 1/0675 416/229 R |

FOREIGN PATENT DOCUMENTS

| | | |
|---|---|---|
| EP | 2669192 A1 | 12/2013 |
| GB | 2237532 A | 5/1991 |
| GB | 2410458 A | 8/2005 |
| WO | 2010117262 A1 | 10/2010 |

OTHER PUBLICATIONS

Armada et al., "Organic Coatings Reinforced With Ceramic Particles: an Erosion Study", pp. 1-8, SINTEF Materials and Chemistry, Norway.
European Search Report and Opinion issued in connection with corresponding EP Application No. 15173805.1 on Dec. 8, 2015.

* cited by examiner

METHODS OF MANUFACTURING ROTOR BLADE COMPONENTS FOR A WIND TURBINE

CROSS REFERENCE TO RELATED APPLICATIONS

This application is a continuation-in-part to U.S. patent application Ser. No. 14/107,040, filed on Dec. 16, 2013, which is fully incorporated by reference and made a part hereof.

FIELD OF THE INVENTION

The present subject matter relates generally to wind turbines and, more particularly, to methods of manufacturing rotor blade components for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The lift force is generated when the flow from a leading edge to a trailing edge creates a pressure difference between the top and bottom surfaces of the blade. Ideally, the flow is attached to the top surface from the leading edge to the trailing edge. However, when the angle of attack of the flow exceeds a certain critical angle, the flow does not reach the trailing edge, but leaves the surface at a flow separation line, which decreases potential energy production.

Hence, in order to increase the energy conversion efficiency during normal operation of the wind turbine, it is desired to increase the lift force of the blades while decreasing the drag force. To this purpose, it is advantageous to increase the attached-flow region and to reduce the detached-flow region by moving flow separation nearer the trailing edge of the blade. As such, it is known in the art to change the aerodynamic characteristics of wind turbine blades by adding various add-ons and/or components on the surface of the blade. For example, such add-ons may generally include leading edge extensions, trailing edge extensions, vortex generators, blade root enhancements, bumps, winglets, airflow modifying elements, and/or any other suitable components.

The rotor blades and many of the add-ons are constructed of a fiberglass composite material due to their large size and typically require specialized tooling and/or molds for their manufacture. For example, the blade halves of a conventional rotor blade are typically formed in large molds that are custom made for the particular size and shape of the rotor blade being produced. More specifically, various rotor blades and/or rotor blade components may be constructed using Resin Transfer Molding (RTM), such as Vacuum Assisted Resin Transfer Molding (VARTM). With the VARTM process, composite parts are made by placing dry fiber reinforcing fabrics into a single part, open mold, enclosing the mold into a vacuum bag, and drawing a vacuum in order to ensure a complete preform infiltration with resin. The mold is then heated to allow the part to cure. The VARTM process makes it possible to produce relatively inexpensive, large, and complex parts in one shot.

Various issues associated with previous methods for manufacturing rotor blades, however, have been identified. For example, many of the RTM processes are time-consuming due to the required cure time for each part. In addition, since rotor blades are constantly moving and flexing in the wind, add-on parts also need to be flexible enough to move with the blade. However, thin fiberglass composite parts are typically inherently brittle and can resist movement of the rotor blades. In many instances, the thickness of the fiberglass parts can be increased to provide a more durable part, but such a modification also adds weight to the rotor blade. While some light-weight, flexible rotor blade components may be manufactured by coating a mold with an elastomeric material and filling it with foam, the foam may impart internal pressure on the mold and the elastomeric material while the foam fills and expands.

Accordingly, alternative methods of manufacturing rotor blade components would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method of manufacturing rotor blade components for a wind turbine. The method generally includes providing a mold of the rotor blade component; coating at least a portion of an interior surface of the mold with an elastomeric material; inserting impletion material within the mold so as to at least partially reduce an open internal volume within the mold; inserting a foam material within the mold; and, removing the rotor blade component from the mold, wherein the elastomeric material forms a cover skin around at least a portion of the rotor blade component.

In some embodiments, the impletion material is secured within the open internal volume. For example, the impletion material may divide the open internal volume into a plurality of chambers such that the foam material may be inserted into a plurality of said chambers. In some embodiments, the impletion material may comprise a compressible material such that, for example, the impletion material at least partially compresses as foam material is inserted. In one embodiment, the elastomeric material may be a polyurea material or any material having similar properties. In a further embodiment, the method may include coating at least a portion of the rotor blade component with the elastomeric material after removing the rotor blade component from the mold. For example, the rotor blade component may be sprayed with the elastomeric material after removal from the mold. As such, in various embodiments, the elastomeric material coated on the interior surface of the mold can help protect the foam material and assists with removing the rotor blade component from the mold, whereas the elastomeric material coated on the rotor blade component after removal from the mold provides additional thickness and durability to the cover skin.

In additional embodiments, the method may include the step of assembling one or more support members within the mold before inserting the foam material within the mold.

The support members may be formed from any suitable material, including a laminate composite material, a metal material, a polymer material, a wood material, or similar, or any combinations thereof. In still another embodiment, the method may include the step of assembling a porous material within the mold before inserting the foam material within the mold.

In further embodiments, the foam material may be a low-density foam. In various embodiments, the rotor blade component may be any one of or combination of a rotor blade shell, a leading edge extension, a trailing edge extension, a blade root enhancement, a low-load bump, a winglet, a vortex generator, an airflow modifying element, or similar.

In another aspect, a method of manufacturing a rotor blade component for a rotor blade of a wind turbine is disclosed. The method generally includes: providing at least one support member for the rotor blade component on a mold surface, wherein the support member defines a profile of the rotor blade component; coating at least a portion of the support member with an elastomeric material; and allowing the elastomeric material to cure on the mold surface so as to form the rotor blade component.

In another embodiment, the method may further include coating at least a portion of the mold surface with an elastomeric material so as to form a base of the rotor blade component. In addition, the elastomeric material may be a polyurea material or any material having similar properties. In another embodiment, the support member may include a laminate composite material, a metal material, a polymer material, a wood material, or similar, or any combinations thereof.

In further embodiments, the step of coating at least a portion of the support member with an elastomeric material may further include spraying at least a portion of the support member with an elastomeric material. In additional embodiments, the mold surface may correspond to a surface of the rotor blade, a surface at a manufacturing facility, or any other suitable surface so as to manufacture the rotor blade component.

In yet another embodiment, the step of coating at least a portion of the support member with an elastomeric material may be completed uptower of the wind turbine. In an alternative embodiment, the step of coating at least a portion of the support member with an elastomeric material can be completed down tower of the wind turbine, e.g. at a manufacturing facility, outdoors, or any other suitable location. As mentioned, it should be understood that the rotor blade component may include any one of or a combination of a rotor blade shell, a leading edge extension, a trailing edge extension, a blade root enhancement, a low-load bump, a winglet, a vortex generator, an airflow modifying element, or similar.

In yet another aspect, a rotor blade component for a rotor blade of a wind turbine is disclosed. The rotor blade component generally includes a body defining a profile of the rotor blade component and having an internal volume. Further, the rotor blade component includes an impletion material configured within the body to at least partially reduce the open internal volume, a foam material configured within the internal volume of the body and a cover skin surrounding at least a portion of the foam material. In addition, the cover skin may define an exterior surface of at least a portion of the rotor blade component. Moreover, the cover skin may include an elastomeric material such that the rotor blade component is configured to flex with the rotor blade during operation of the wind turbine.

In a further embodiment, the elastomeric material may be a polyurea material or any material having similar properties. In another embodiment, the rotor blade component may include one or more support members configured within the foam material. In still additional embodiments, the rotor blade component may be any one of or combination of a rotor blade shell, a leading edge extension, a trailing edge extension, a blade root enhancement, a low-load bump, a winglet, a vortex generator, an airflow modifying element, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved methods of manufacturing rotor blade components for wind turbines and rotor blade components produced in accordance with such methods. In particular, the disclosed rotor blade components may be manufactured by coating at least a portion of an interior surface of a mold with an elastomeric material, e.g. a polyurea material. An impletion material may be inserted within the mold to reduce the open internal volume. A foam material may then be inserted or injected within the mold and allowed to cure therein. The cured rotor blade component may then be removed from the mold such that the elastomeric material forms a cover skin around at least a portion of the rotor blade component. The rotor blade component may also be further coated (e.g. sprayed) after removal to provide an additional layer to the cover skin.

In an alternative embodiment, the rotor blade components may be manufactured by providing at least one support member defining a profile of the rotor blade component on a mold surface, coating the support member with an elastomeric material, and allowing the elastomeric material to cure on the mold surface so as to form the rotor blade component. In addition, at least a portion of the mold surface may be coated with the elastomeric material. As such, the elastomeric material is capable of forming a cover skin around the support member to form the rotor blade component.

Rotor blade components manufactured according to the methods described herein provide many advantages not present in the cited art. For example, the methods described herein are capable of producing light-weight, relatively large or small parts quickly and efficiently. Further, the method provides components having high elongation properties and strength. In addition, in some embodiments, the combination of the foam material coated with the elastomeric material provides a rotor blade component that is stiff enough to hold its shape during handling, installation, and operation, but is also capable of deflecting with the rotor blade during wind turbine operation. Moreover, in some embodiments, impletion material may be utilized to reduce the open internal volume filled by foam to reduce the amount of stress the foam may impose on the elastomeric material and overall mold. As such, the methods of manufacturing described herein provide rotor blade components that are strong and flexible. As used herein, the term "flexible" is meant to encompass its general broad meaning and the ability of the rotor blade component to bend or flex with the rotor blade easily without breaking.

Figure 1:
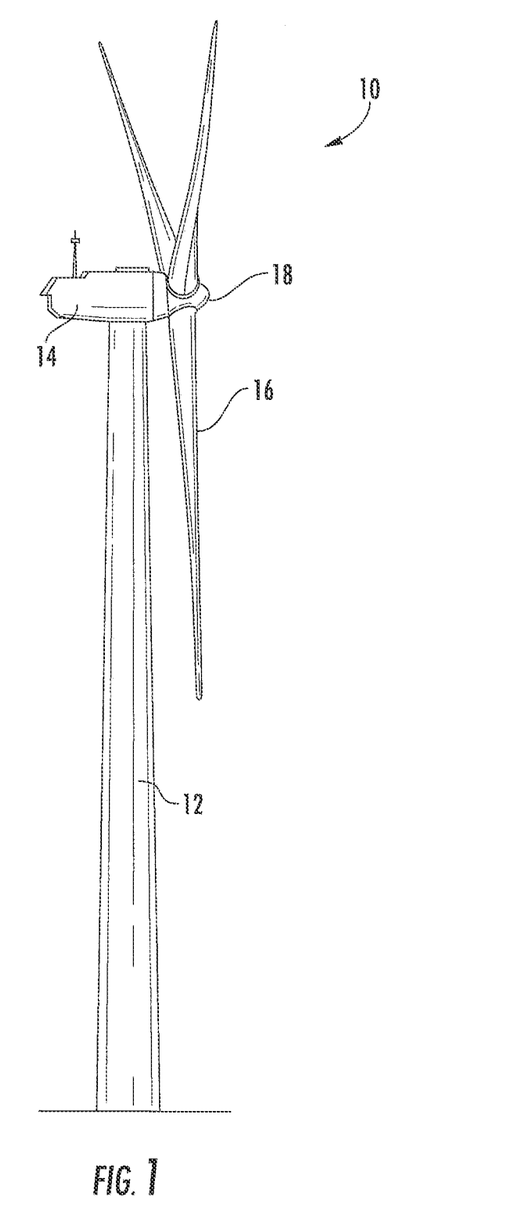
FIG. 1 illustrates a perspective view of a conventional wind turbine.

Referring to the drawings, FIG. 1 illustrates a perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Figure 2:
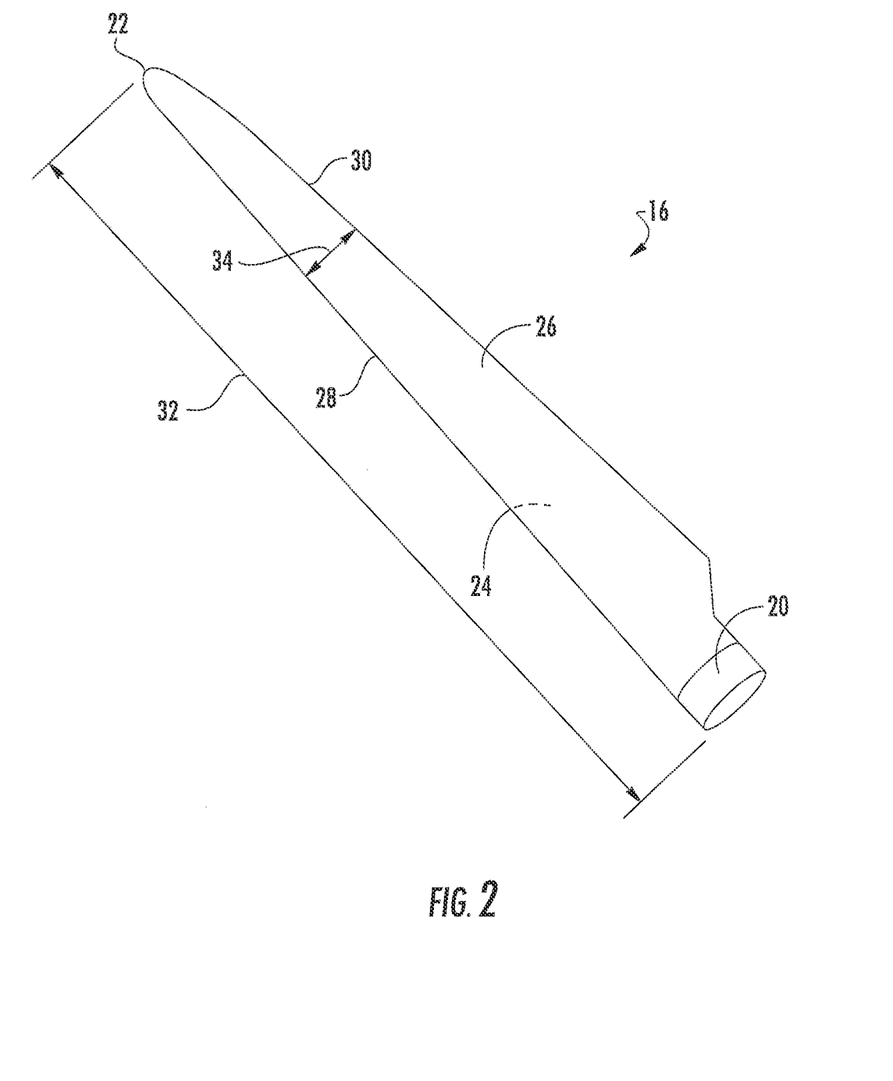
FIG. 2 illustrates a perspective view of a conventional rotor blade.

Referring now to FIG. 2, there is illustrated a perspective view of a rotor blade 16 of conventional construction. As shown, the rotor blade 16 includes a blade root 20 configured for mounting the rotor blade 16 to a mounting flange (not shown) of the wind turbine hub 18 (FIG. 1) and a blade tip 22 disposed opposite the blade root 20. The rotor blade 16 may also include a pressure side 24 and a suction side 26 extending between a leading edge 28 and a trailing edge 30. Additionally, the rotor blade 16 may include a span 32 defining the total length between the blade root 20 and the blade tip 22 and a chord 34 defining the total length between the leading edge 28 and the trailing edge 30. As is generally understood, the chord 34 may vary in length with respect to the span 32 as the rotor blade 16 extends from the blade root 20 to the blade tip 22.

Additionally, the rotor blade 16 may define any suitable aerodynamic profile. Thus, in several embodiments, the rotor blade 16 may define an airfoil shaped cross-section. For example, the rotor blade 16 may be configured as a symmetrical airfoil or a cambered airfoil. Further, the rotor blade 16 may also be aeroelastically tailored. Aeroelastic tailoring of the rotor blade 16 may entail bending the blade 16 in a generally chordwise direction and/or in a generally spanwise direction. The chordwise direction generally corresponds to a direction parallel to the chord 34 defined between the leading and trailing edges 28, 30 of the rotor blade 16. Additionally, the spanwise direction generally corresponds to a direction parallel to the span 32 of the rotor blade 16.

Figure 3:
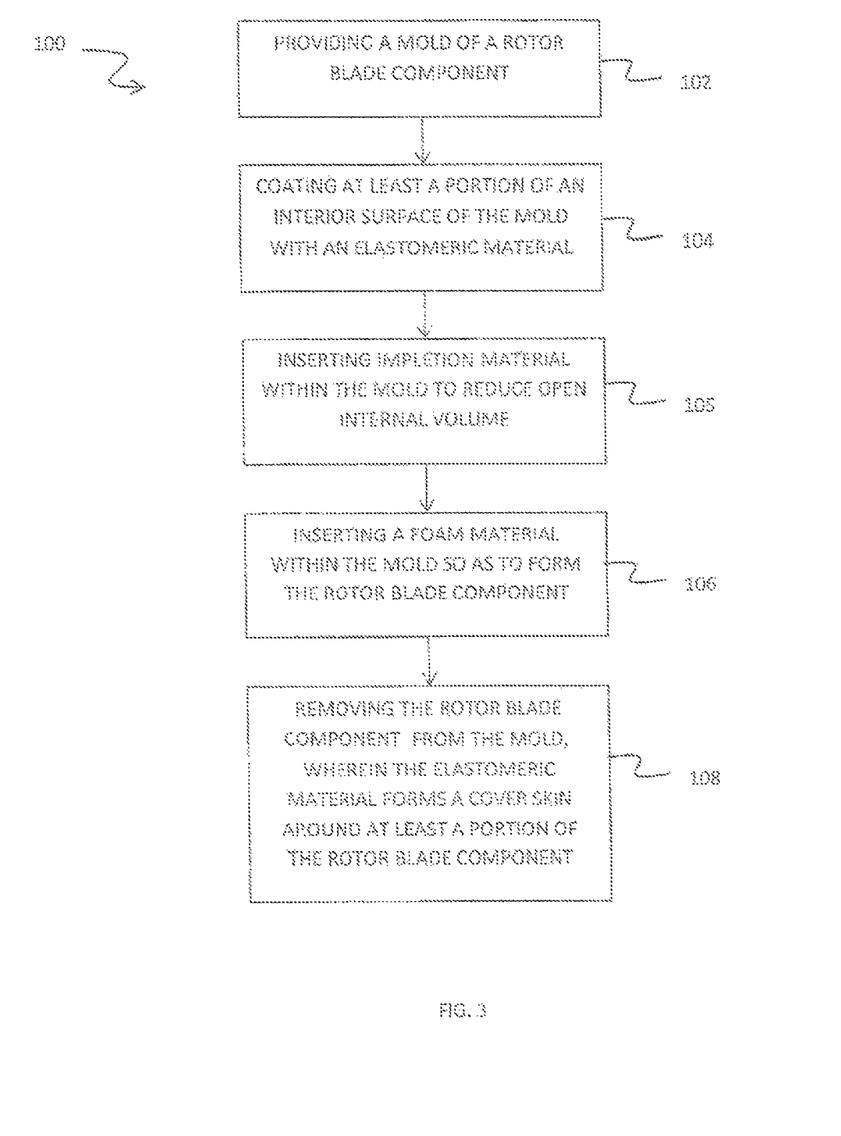
FIG. 3 illustrates a flow diagram of one embodiment of a method of manufacturing a rotor blade component in accordance with aspects of the present disclosure.
Figure 4:
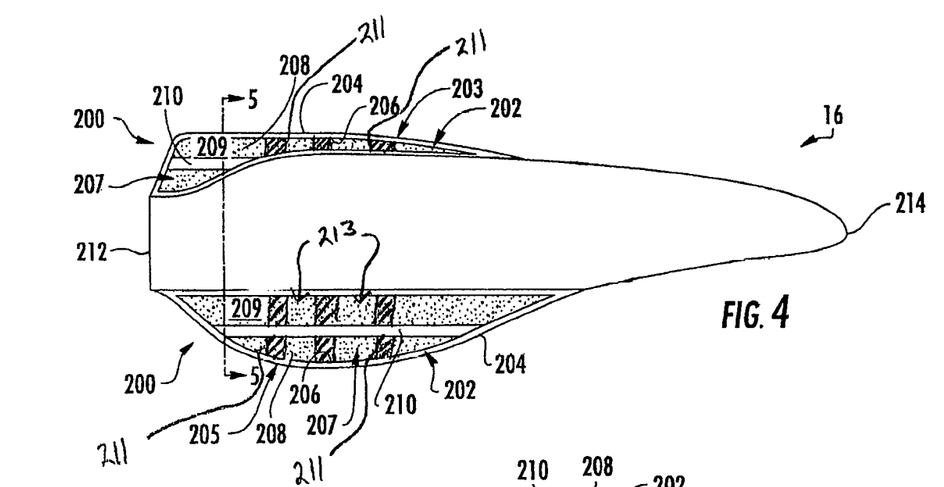
FIG. 4 illustrates a span-wise view of a rotor blade having rotor blade components installed thereon in accordance with aspects of the present disclosure.
Figure 5:
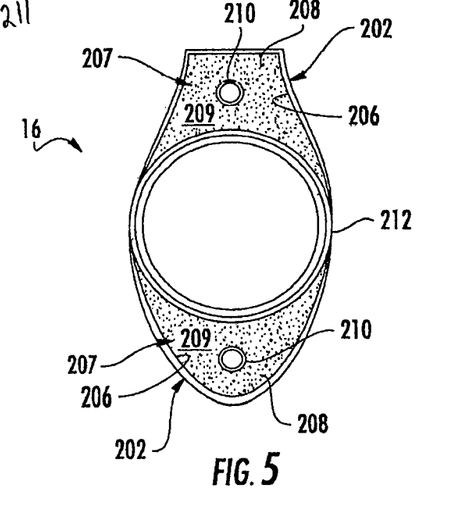
FIG. 5 illustrates a chord-wise view of a rotor blade having rotor blade components installed thereon in accordance with aspects of the present disclosure.

As indicated above, the present subject matter is generally directed to methods of manufacturing rotor blade components for the wind turbine 10 and also rotor blade components produced in accordance with such methods. Accordingly, one embodiment of a method 100 for manufacturing a rotor blade component will generally be described with reference to FIG. 3 and will be explained in greater detail with reference to FIGS. 4-5. As shown, the method 100 a step 102 of providing a mold of the rotor blade component. The mold can be any suitable mold having any desired shape to achieve a rotor blade component as described herein. For example, in one embodiment, the mold has the shape of a leading edge extension or a trailing edge extension (FIGS. 4 and 5). In addition, the mold may be a single mold or a mold having multiple pieces, such as two halves.

The method 100 also includes a step 104 of coating (e.g. spraying) at least a portion of an interior surface of the mold with an elastomeric material, e.g. a polyurea material. In addition, in a particular embodiment, a mold having two halves may be provided on a mold surface such that one or more flanges may be formed on the rotor blade component when spraying the elastomeric material. Such flanges can be used for attaching the rotor blade component to the rotor blade.

Alternatively, the method 100 may eliminate step 104 and move directly to step 105, which includes inserting (e.g., injecting) impletion material within the mold and then to step 106, which includes inserting a foam material within the mold. The method 100 may then include a step 108 of removing the rotor blade component from the mold. The rotor blade component may also be coated with the elastomeric material, partially or entirely, upon removal from the mold. As such, the sprayed-on elastomeric material is configured to form a cover skin around at least a portion of the rotor blade component. It should be appreciated that, although the various method elements 102, 104, 105, 106, 108 illustrated in FIG. 3 are shown in a particular order, the elements may generally be performed in any sequence and/or order consistent with the disclosure provided herein.

Referring now to FIGS. 4 and 5, various rotor blade components 200 manufactured according to the present subject matter assembled on the rotor blade 16 are illustrated. In particular, FIG. 4 illustrates a cross-sectional, span-wise view of the rotor blade components 200 attached to the rotor blade 16. FIG. 5 illustrates a cross-sectional, chord-wise view of the rotor blade components 200 attached to the rotor blade 16. More specifically, as shown, the illustrated rotor blade components 200 include a leading edge extension 203 and a trailing edge extension 205. In further embodiments, the rotor blade components 200 can be any suitable component for the rotor blade, including, but not limited to a blade root enhancement, a low-load bump, a winglet, a vortex generator, an airflow modifying element, or any other suitable add-on for the rotor blade 16.

As shown, the rotor blade components 200 include a body 207 that generally defines a profile or shape of the rotor blade component 200 and has an internal volume 209. The internal volume 209 is initially open until impletion material 211 is inserted therein. As used herein, "impletion material" refers to any material or materials that take up space and reduce the open internal volume 209 of the body 207 of the rotor blade component 200. The impletion material 211 can be a single type of material or a plurality of different types of material. Furthermore, the impletion material 211 may not be utilized for structural support within the rotor blade component 200, but merely facilitate the retaining of the shape of the rotor blade component 200 during the subsequent insertion of foam material 208 in step 106.

For example, in some embodiments the impletion material 211 may comprise a foam preform. Such a foam preform may comprise the same or similar foam material that is to be inserted in step 106 but in a preformed state that is already hardened. Foam preforms may comprise any shape and size, such as one that is already shaped to conform to the interior of the body 207. In some embodiments, the impletion material 211 may comprise one or more hollow elements. For example, the impletion material 211 may comprise PVC balls, cylinders, cubes or other shapes. In even some embodiments, the impletion material 211 may comprise inflatable bags such as commercially available dunnage bags.

Still referring to FIGS. 4 and 5, in some embodiments, inserting the impletion material 211 may comprise securing said impletion material 211 within the open internal volume 209. Securing the impletion material 211 may be facilitated by any suitable method such as through adhesives, clamps, screws, bolts, tacks, or the like. In even some embodiments, the impletion material 211 may be secured in a configuration to divide the open internal volume 209 into a plurality of chambers 213. The plurality of chambers 213 may help facilitate select and partial filling of the mold with the foam material in step 306.

In even some embodiments, the impletion material 211 may comprise a compressible material such as one that may at least partially compress by adjacent expanding foam material 208. For example, compressible impletion material 211 (e.g., dunnage bags, cardboard boxes/tubes, corrugated cardboard or the like) may initially be inserted into the mold. As subsequent foam material 208 is inserted into the mold, the foam material 208 may expand and provide additional stress against the mold and/or coating as well as against the compressible impletion material 211. The compressible impletion material 211 may thereby at least partially compress in response to the pressure of the expanding foam thereby relieving said pressure away from the mold and/or coating.

After the impletion material 211 is inserted into the mold, the remaining open space of the internal volume 209 of the body 207 is filled with a filler material 208, e.g. a foam material. The cover skin 202 at least partially surrounds the foam material 208 so as to define an exterior surface 204 of the rotor blade component 200. In addition, the cover skin 202 includes an elastomeric material, such as a polyurea material, such that the rotor blade component 200 is configured to flex with the rotor blade 16 during operation of the wind turbine 10. The rotor blade component 200 may also include one or more support members 210 configured within the foam material 208. For example, as shown, the support members 210 may extend in a generally span-wise direction, such as from generally adjacent the blade root 212 towards the blade tip 214, in the foam material 208 of the rotor blade component 200.

In still further embodiments, the rotor blade components 200 may include a porous material, e.g. felt, between the elastomeric material 202 and the foam material 208. The porous material may be any suitable material configured to improve the mechanical bond between the elastomeric material 202 and the foam material 208. For example, in one embodiment, the elastomeric material 202 is applied to the mold, the porous material is applied to the mold before the elastomeric material has time to cure, and then the mold is filled with the foam material. As such, the porous material soaks up the wet elastomeric material and provides a better mechanical interface and/or bond between the elastomeric material and the foam material.

As indicated above, the impletion material 211 and the foam material 208 of the disclosed rotor blade component 200 may generally be disposed throughout the interior of the body 207 of the blade component 200. In particular, the foam material 208 may be configured to extend between each of the support members 210 and/or between the support members 210 and the cover skin 202 so as to occupy or fill at least a portion of the internal volume 209 of the body 207 of the rotor blade component 200 that is not filled by the impletion material 211. As used herein with reference to FIGS. 4-5, the term "internal volume" refers to the volume 209 of the body 207 of the various rotor blade components 200 defined by the inner surfaces 206 of the cover skin 202 which is not otherwise occupied by the support member(s) 210. In several embodiments, the foam material 208 may be configured to occupy a substantial portion of the inner volume of the body 207 not otherwise filled by impletion material 211. For example, the foam material 208 may be configured to occupy greater than 50% of the remaining inner volume of the body 207, such as greater than 75% of the remaining inner volume or greater than 85% of the remaining inner volume or greater than 95% of the remaining inner volume. As such, the foam material 208 improves buckling strength of the rotor blade component 200. Alternatively, the foam material 208 may be configured to occupy less than 50% of the remaining inner volume of the body 207.

It should be appreciated that the foam material 208 may generally include any suitable material which is capable of being injected into a mold, machined (e.g. foam panels), or otherwise shaped into the profile of the rotor blade component 200, or any combinations thereof. For example, in one embodiment, the foam materials 208 may be a combination of sprayed foam and foam panels. In such an embodiment, the foam panels may be installed within the mold so as to divide the mold in sections. The sprayable foam may be then be sprayed into the different sections to achieve a desired density of the rotor blade component.

In several embodiments of the present subject matter, the foam material 208 may comprise a relatively lightweight, low-density material. Thus, in a particular embodiment, the foam material 208 may comprise a low-density foam or core material. For example, the foam material 208 may include a density ranging from about 0.5 pounds per cubic feet (lbs/ft$^3$) to about 3 lbs/ft$^3$, more preferably about 2 lbs/ft$^3$. In further embodiments, the foam material 208 may have a density of less than 0.5 lbs/ft$^3$ or a density greater than 3 lbs/ft$^3$, such as 20 lbs/ft$^3$, or any other suitable density.

Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams. Alternatively, the foam material 208 may include other suitable low-density materials, such as balsa wood, cork and the like.

Referring still to FIGS. 4 and 5, the support members 210 may generally be configured as structural components for the disclosed rotor blade component 200. For example, the support members 210 may be configured to provide support for the foam material 208 during manufacturing of the rotor blade component 200. Additionally, the support members 210 may be configured to provide stiffness and/or strength to the rotor blade component 200 during operation of the wind turbine 10. Thus, it should be appreciated that the support members 210 may generally have any suitable shape, size, cross-section and/or configuration that permits the support members 210 to function as described herein.

In particular, in several embodiments, the support members 210 may be configured to extend lengthwise within the rotor blade component 200. For example, in the illustrated embodiment, the support members 210 may be configured to extend lengthwise within the rotor blade component 200 from the blade root 212 towards the blade tip 214. Additionally, the support members 210 may be configured as a solid (i.e., non-hollow) structural component defining any suitable cross-sectional shape. Alternatively, it should be appreciated that the support members 210 may generally be configured as hollow components defining any suitable cross-sectional shape. The cross-sectional shape, for example, may be rectangular, circular, elliptical, triangular or square shape. Additionally, the support members 210 may generally define any suitable height and chord-wise width within the rotor blade component 200.

Additionally, the support members 210 may generally define any suitable height and chordwise width within the rotor blade component 200. For example, each of the support members 210 may define a height extending between the inner surfaces 206 of the cover skin 202. Moreover, in another embodiment, the support members 210 may be oriented within the rotor blade component 200 perpendicular to the orientation shown in FIGS. 4 and 5 (i.e., in the chordwise direction).

Further, the support members 210 may generally be formed from any suitable material. However, in several embodiments of the present subject matter, the support members 210 may be formed from a relatively stiff and/or durable material so as to provide stiffness and/or strength to the rotor blade component 200. For example, the support members 210 may be formed from any suitable laminate composite materials (e.g., fiber-reinforced laminates), polymer materials (e.g., high strength plastics), metal materials (e.g., aluminum), a wood material or any other suitable materials or combinations of materials. Additionally, it should be appreciated that, although each of the disclosed rotor blade components 200 are depicted as including one support member 210, the rotor blade components 200 may generally include any number of support members 210, such as two or more support members 210.

Referring still to FIGS. 4 and 5, as indicated above, the rotor blade component 200 includes cover skin 202 defining the exterior surface 204 of the rotor blade component 200. In general, the cover skin 202 may be configured to be disposed around the outer perimeter of the foam material 208 such that a smooth, aerodynamic profile is defined by the rotor blade component 200. Additionally, as an outer coating for the rotor blade component 200, the cover skin 202 may provide support as well as protection to the foam material 208 (e.g., impact protection).

It should be appreciated that the cover skin 202 may generally comprise any suitable material and may be formed using any suitable method and/or process. For example, in one embodiment, the cover skin 202 may be any suitable elastomeric material. Suitable elastomeric materials may include woven or nonwoven elastomeric materials, elastomeric films, elastomeric laminates and combinations thereof. The cover skin 202 material may also include other woven or nonwoven materials, or stretchable but inelastic materials.

In additional embodiments, the cover skin 202 includes a spray-on elastomeric material. More specifically, in a further embodiment, the cover skin 202 includes a spray-on polyurea elastomeric spray-on compound. As used herein, a "polyurea material" or a "polyurea" includes any organic polymer formed by the reaction of isocyanate with an amine terminated polyether resin, thereby forming a plastic-like or rubber-like compound. Suitable polyurea materials typically include fast reactivity, relative insensitivity to moisture, excellent adhesion to surfaces, and high strength. For example, in various embodiments, the polyurea may have a strength of 6000 pounds per square inch (psi) tensile and over 500% elongation. In addition, the quick cure time allows many coats to be built up quickly. In another embodiment, the spray-on surface coating may be a polyurethane elastomeric spray-on compound.

As mentioned, the elastomeric material may have high elongation properties. For example, the cover skin 202 may include elongation properties of greater than about 100%, such as greater than 200% or greater than 300% or greater than 500%. As used herein and in the claims, the terms "elastic" and "elastomeric" have their usual broad meanings. For example, for purposes of this invention "elastic" and "elastomeric" may be conveniently defined as any material, such as natural or synthetic rubber, that is able to resume its original shape when a deforming force is removed. It should also be understood that the terms "elastic" and "elastomeric" are not limited by the definition and can have any suitable definition commonly known in the art.

In addition, the elastomeric material as described herein may have any suitable hardness. For purposes of the present disclosure, the "hardness" of the material is a measure of the material's resistance to permanent indentation or deformation. The Shore D durometer scale is most commonly used to measure the hardness of harder materials, e.g., steel, whereas the Shore A scale is used for softer materials, e.g. rubber. Within the scale, a higher number indicates a harder material. The elastomeric material may have a hardness ranging from about Shore A 30 (very soft) to about Shore D 80 (very hard). As such, the hardness of the elastomeric material may help to protect the surface of the rotor blade component against any impacts or point damages, for example, during transport after manufacture or during operation of the wind turbine.

Figure 6:
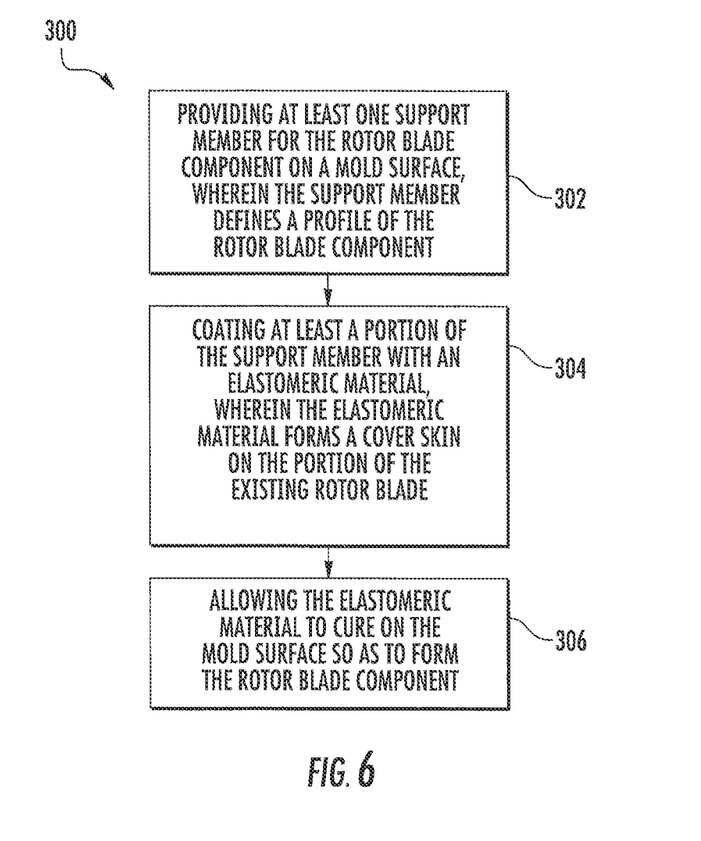
FIG. 6 illustrates a flow diagram of another embodiment of a method of manufacturing a rotor blade component in accordance with aspects of the present disclosure.

Referring now to FIG. 6, another embodiment of a method 300 for manufacturing a rotor blade component according to the present subject matter is illustrated. In addition, the method 300 of FIG. 6 will be explained in greater detail with reference to FIGS. 7-8. As shown, the method 300 includes a step 302 of providing at least one support member for the rotor blade component on a mold surface. For example, in one embodiment, the support member is provided to define a profile or shape of the rotor blade component. In addition, the support member may be placed on any suitable mold surface. For example, in one embodiment, the mold surface may be a surface of an existing rotor blade of the wind turbine. Alternatively, the mold surface may be any suitable surface configured for manufacturing the rotor blade components as described herein, such as any surface located in a manufacturing facility.

Figure 8:
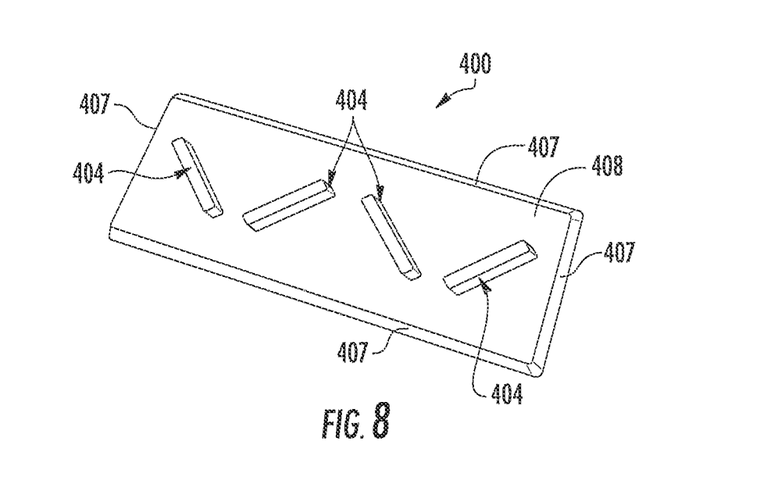

Still referring to FIG. 6, the method 300 may also include a step 304 of coating at least a portion of the support member with an elastomeric material. For example, in one embodiment, the method 300 includes spraying the support member with an elastomeric material, e.g. a polyurea material. In addition, the method may include coating at least a portion of the mold surface with the elastomeric material so as to form a base and/or flange of the rotor blade component. For example, as shown in FIG. 8, the base 408 of the vortex generator 402 can be formed by spraying the mold surface in addition to the support members. Further, the edges 407 of the base 408 may be tapered (i.e. by spraying a thinner layer of elastomeric material from the center towards the edges 407) to provide the vortex generator 402 with a more aerodynamic shape. Moreover, it should be understood by those of ordinary skill in the art that the coating and/or spraying of the elastomeric material can be varied for any suitable application such that the thickness of the cover skin may be varied where desired.

Figure 7:
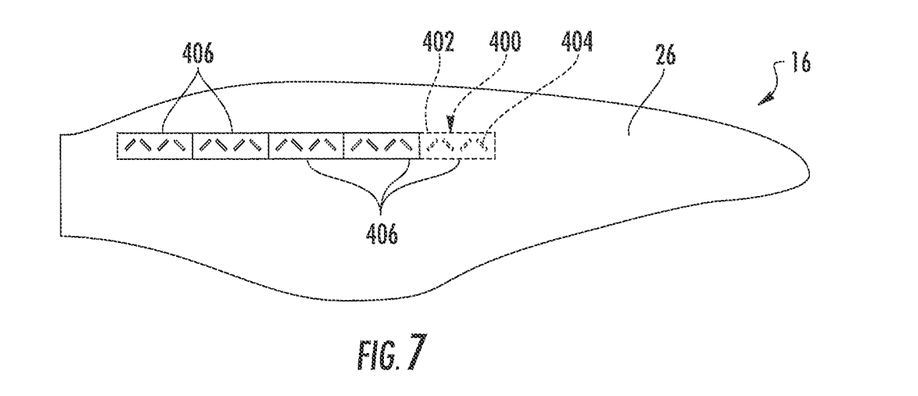
FIG. 7 illustrates a span-wise view of a rotor blade having rotor blade components installed thereon manufactured in accordance with aspects of the present disclosure; and, FIG. 8 illustrates a rotor blade component manufactured in accordance with aspects of the present disclosure.

The method 300 may also include a step 306 of allowing the elastomeric material to cure on the mold surface so as to form the rotor blade component. If the mold surface corresponds to a surface of the rotor blade 16, then the rotor blade component can remain in place after formation. For example, as shown in FIG. 7, the support members 404 are placed in the desired location on the suction side surface 26 of the rotor blade 16, and the elastomeric material is sprayed onto the surface 26 so as to cover a portion of the support members 404 and a portion of the mold surface 26 and left in place to cure. Such an embodiment provides an improved vortex generator with tapered edges 407 so as to enhance aerodynamic performance.

In additional embodiments, if the mold surface is a surface in a manufacturing facility (not shown), the parts can be transported to a wind turbine site after production and subsequently installed on a rotor blade depending on the type of rotor blade component. In one embodiment, for example, the rotor blade component can be easily installed via the base and/or flanges formed by spraying the mold surface in addition to the support members with the elastomeric material.

It should be appreciated that, although the various method elements 302, 304, 306 illustrated in FIG. 6 are shown in a particular order, the elements may generally be performed in any sequence and/or order consistent with the disclosure provided herein. Accordingly, new rotor blade components may be produced without the need for specialized, custom molds. As such, new rotor blade components may be manufactured immediately, without the additional time required for creating and/or obtaining such specialized molds.

Referring still to FIGS. 7 and 8, one embodiment of a rotor blade component 400 manufactured according to the method 300 as described herein is illustrated. For example, as shown, a plurality of support members 404 are provided on the suction side surface 26 of the rotor blade 16, which correspond to the locations of the raised surfaces 406 of the vortex generator 402. As such, the rotor blade component 400 may be formed by coating and/or spraying the support members 404 with a polyurea coating. The polyurea coating may be allowed to cure on the mold surface (i.e. the suction side surface 26 of the rotor blade 16) so as to form the rotor blade component 400. As such, in various embodiments, rotor blade components manufactured according to such a method can be completed uptower of the wind turbine 10. Accordingly, new rotor blade components may be produced quicker, easier, and at a reduced cost when compared to conventional methods. In addition, in particular embodiments, the sprayed-on elastomeric material forms the rotor blade component without the use of the foam material. As mentioned, in further embodiments, the rotor blade component can be manufactured in any other suitable controlled or uncontrolled environment, such as a manufacturing facility or outdoors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a rotor blade component for a rotor blade of a wind turbine, the method comprising:
   providing a mold of the rotor blade component;
   coating at least a portion of an interior surface of the mold with an elastomeric polyurea material;
   inserting impletion material within the mold so as to contact the elastomeric polyurea material and at least partially reduce an open internal volume within the mold;
   after inserting the impletion material, inserting a foam material within the mold in contact with the impletion material and the elastomeric polyurea material so as to form the rotor blade component; and
   removing the rotor blade component from the mold, wherein the elastomeric polyurea material forms a cover skin around at least a portion of the rotor blade component.

2. The method of claim 1, wherein inserting impletion material comprises securing the impletion material in place within the open internal volume.

3. The method of claim 2, wherein securing the impletion material divides the open internal volume into a plurality of chambers.

4. The method of claim 3, wherein inserting the foam material within the mold comprises inserting foam material into at least two of the plurality of chambers.

5. The method of claim 1, wherein the impletion material comprises a compressible material.

6. The method of claim 5, wherein at least some of the impletion material at least partially compresses when foam material is inserted within the mold.

7. The method of claim 1, wherein the impletion material comprises one or more foam preforms.

8. The method of claim 1, wherein the impletion material comprises one or more hollow elements.

9. The method of claim 1, further comprising assembling one or more support members within the mold before inserting the foam material within the mold.

10. The method of claim 1, wherein the rotor blade component comprises one of a rotor blade shell, a leading edge extension, a trailing edge extension, a blade root enhancement, a low-load bump, a winglet, a vortex generator, or an airflow modifying element.

11. A rotor blade component for a rotor blade of a wind turbine, the rotor blade component comprising:
a body defining a profile of the rotor blade component, the body comprising an internal volume;
an impletion material configured within the body to at least partially reduce the internal volume;
a foam material configured within the internal volume of the body in contact with the impletion material; and
a cover skin surrounding and contacting at least a portion of the foam material and the impletion material, and defining an exterior surface of the rotor blade component, the cover skin comprising an elastomeric polyurea material,
wherein the rotor blade component is configured to flex with the rotor blade during operation of the wind turbine.

12. The rotor blade component of claim 11, wherein the impletion material is secured in place within the internal volume.

13. The rotor blade component of claim 12, wherein the secured impletion material divides the internal volume into a plurality of chambers.

14. The rotor blade component of claim 13, wherein the foam material is configured within at least two of the plurality of chambers.

15. The rotor blade component of claim 11, wherein the impletion material comprises a compressible material.

16. The rotor blade component of claim 15, wherein at least a portion of the impletion material is at least partially compressed by the foam material.

17. The rotor blade component of claim 11, wherein the impletion material comprises one or more foam preforms.

18. The rotor blade component of claim 11, wherein the impletion material comprises one or more hollow elements.

19. The rotor blade component of claim 11, further comprising one or more support members within the foam material.

20. The rotor blade component of claim 11, wherein the rotor blade component comprises one of a rotor blade shell, a leading edge extension, a trailing edge extension, a blade root enhancement, a low-load bump, a winglet, a vortex generator, or an airflow modifying element.

* * * * *